United States Patent [19]

McChesney

[11] 4,098,348

[45] Jul. 4, 1978

[54] DISC HARROW WITH SUPPORT WHEELS HAVING INTERCONNECTED SEPARATE MOUNTING MECHANISMS

[75] Inventor: Leroy S. McChesney, Memphis, Tenn.

[73] Assignee: Towner Manufacturing Company, Santa Ana, Calif.

[21] Appl. No.: 773,939

[22] Filed: Mar. 3, 1977

[51] Int. Cl.² ............................................. A01B 63/22
[52] U.S. Cl. ................................... 172/406; 172/400; 172/413; 172/414; 172/421; 172/599
[58] Field of Search ............... 172/239, 240, 315, 316, 172/327, 328, 400, 413, 401, 421, 491, 501, 502, 668, 406, 596, 599; 280/6.1, 6.11, 6 H, 43, 43.11, 43.13, 43.16, 43.17, 43.19, 43.22, 43.23

[56] References Cited

U.S. PATENT DOCUMENTS

| 932,376 | 8/1909 | Desy | 172/406 |
|---|---|---|---|
| 1,931,815 | 10/1933 | Conley | 172/401 |
| 2,059,205 | 11/1936 | Buffington | 280/43.23 |
| 3,008,772 | 11/1961 | Helsel, Sr. | 305/10 |
| 3,195,652 | 7/1965 | Murray et al. | 172/414 |

FOREIGN PATENT DOCUMENTS

| 2,278,235 | 2/1976 | France | 172/413 |

Primary Examiner—Richard T. Stouffer
Attorney, Agent, or Firm—Harvey C. Nienow

[57] ABSTRACT

A disc harrow having a pair of spaced support wheels each having its own operating mechanism including a hydraulic actuator for raising and lowering the respective wheel, but wherein the mechanisms are mechanically linked together to ensure substantially simultaneous raising and lowering of the wheels. The interconnecting link includes a spring biased lost motion device whereby one of the hydraulic actuators can be adjusted to permit the wheels to assume different positions of elevation, while, nonetheless, preserving the substantially simultaneous operation feature.

10 Claims, 8 Drawing Figures

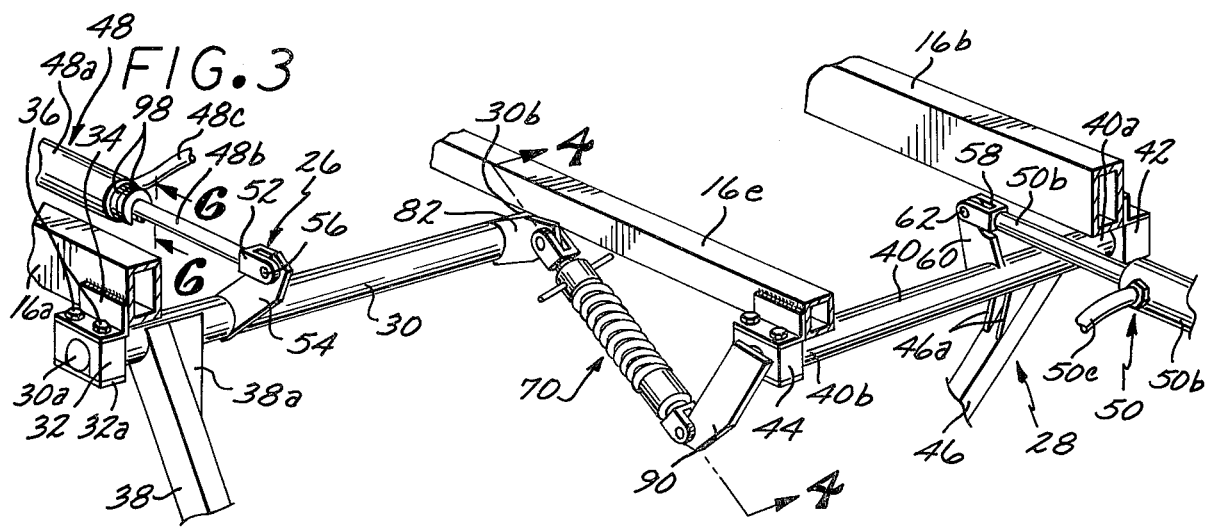
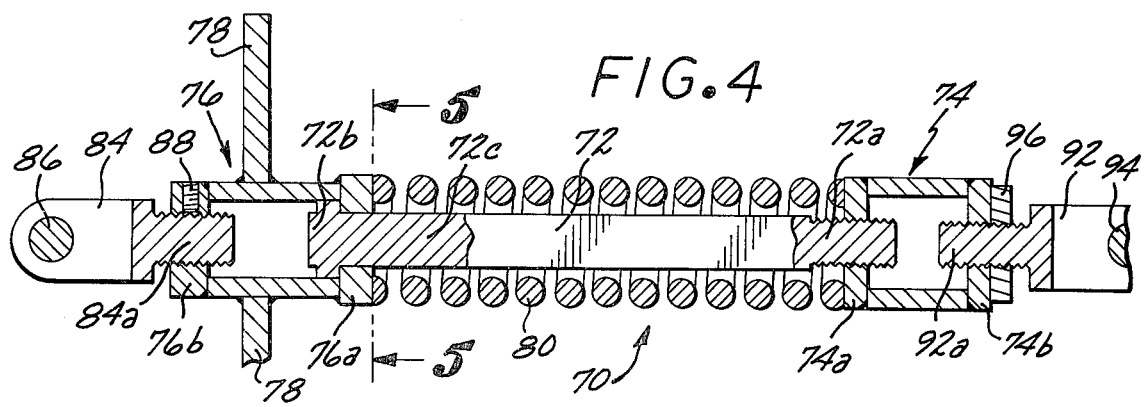
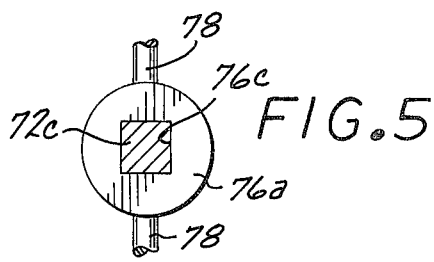
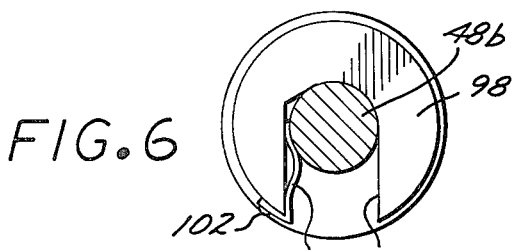
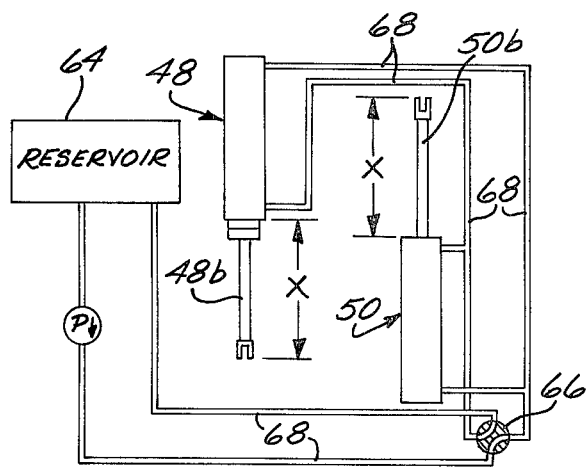
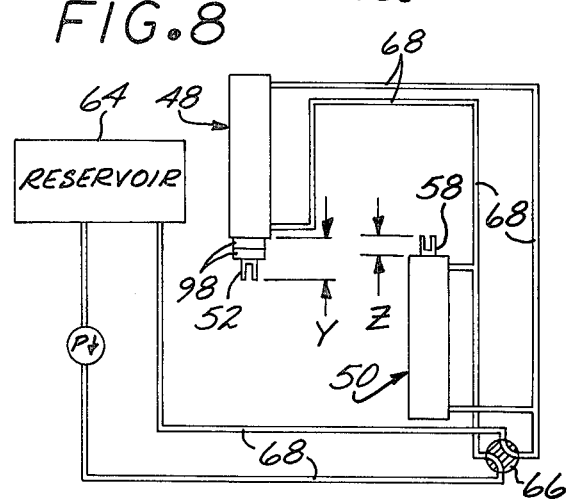

DISC HARROW WITH SUPPORT WHEELS HAVING INTERCONNECTED SEPARATE MOUNTING MECHANISMS

The present invention relates generally to disc harrows, but more particularly to disc harrows having support wheels which can be adjusted for optimum operation and transport conditions.

Within recent past years, disc harrows have become larger in size to enable larger areas of ground to be disced within a given amount of time. This results in greater efficiency and hence less cost in performing this particular ground-working operation.

The support wheels and raising and lowering mechanisms for such wheels have become correspondingly stronger to withstand the heavier loads associated with larger disc harrows. Individual hydraulic actuators have been provided for raising and lowering the support wheels. However, due to uneven weight distribution, it has frequently resulted that, during transport, prior disc harrows assumed an uneven or tilted position. Also, it is desirable sometimes to operate the harrow with the support wheels on the ground so as to control the depth of cut of the discs during the discing operation.

It is an object of the present invention to provide a disc harrow having support wheels which can be adjusted for supporting the harrow in horizontal position during transport, irrespective of the use of separate hydraulic actuators.

A further object of the present invention is to provide a disc harrow as characterized above wherein separate operating mechanisms for the support wheels are provided but wherein the mechanisms are interconnected to ensure substantially simultaneous operation and positioning of the wheels.

Another object of the present invention is to provide a disc harrow as characterized above wherein the wheels can be positioned at different elevations for use during the discing operation, notwithstanding the interconnection between the mechanisms.

Another further object of the present invention is to provide a disc harrow as characterized above wherein an interconnecting link is provided which includes spring biased lost motion means for permitting different elevational positions to be provided while nonetheless preserving the ability to move such wheels substantially simultaneously, when desired.

A still further object of the present invention is to provide a disc harrow having substantially independently operable wheels but wherein hydraulic actuators therefor are caused to assist each other during movement so that such wheels move substantially simultaneously.

An even further object of the present invention is to provide a disc harrow as characterized above which is simple and inexpensive to manufacture and which is rugged and dependable in operation.

The novel features which I consider characteristic of my invention are set forth with particularity in the appended claims. The invention itself, however, both as to its organization and mode of operation, together with additional objects and advantages thereof, will best be understood from the following description of specific embodiments when read in connection with the accompanying drawings, in which:

FIG. 3 is a fragmentary sectional view of a portion of the operating mechanism for the wheels;

FIG. 4 is a fragmentary sectional view taken substantially along line 4—4 of FIG. 3;

FIG. 5 is a fragmentary sectional view taken substantially along line 5—5 of FIG. 4;

FIG. 6 is a fragmentary sectional view taken substantially along line 6—6 of FIG. 3;

FIG. 7 is a schematic view of the hydraulic system showing the hydraulic actuator lowered or extended; and FIG. 8 is a similar schematic view of the hydraulic circuit, but showing the actuators retracted or raised.

Like reference characters indicate corresponding parts throughout the several views of the drawings.

Figure 1:
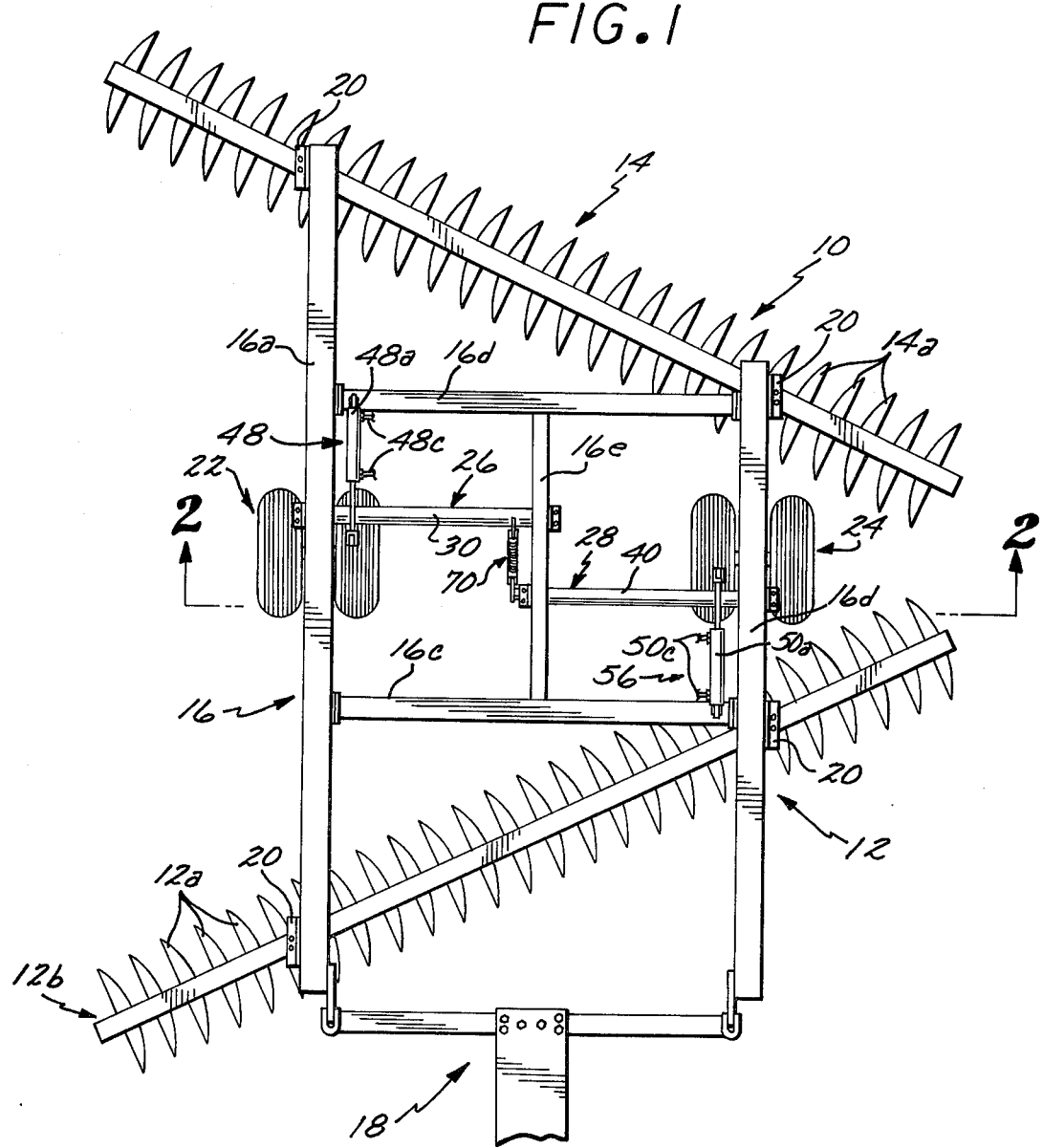
FIG. 1 is a top plan view of a disc harrow according to the present invention.

Referring to FIG. 1 of the drawings, there is shown therein a disc harrow 10 which comprises a pair of disc gangs 12 and 14 carried by a generally box-shaped frame 16. A hitch 18 is provided at the forward end of harrow 10 for connection to a tractor or other motive power means (not shown) for pulling the harrow over the ground to be worked or disced. Such hitch is connected to a spreader bar which is connected to the frame 16.

The forward gang 12 comprises a plurality of discs 12a which are disposed at an angle to the direction of travel of the harrow 10 over the ground, as shown in FIG. 1. In like fashion, the rear gang 14 is comprised of a plurality of similarly shaped discs 14a, and this gang is also disposed at an angle to the general direction of travel of the harrow.

Suitable brackets 20 are employed to firmly secure the respective disc gangs 12 and 14 to tubular longitudinal frame members 16a and 16b of the frame 16. Transverse frame members 16c and 16d as well as longitudinal frame member 16e further comprise the frame 16.

Figure 2:
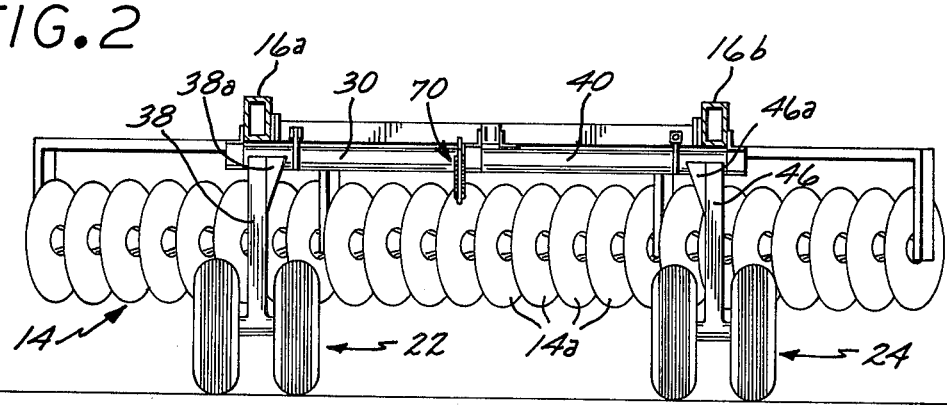
FIG. 2 is a transverse sectional view taken substantially along line 2—2 of FIG. 1.

As shown in FIGS. 1 and 2, there is provided for the disc harrow 10, support wheels which are shown as comprising two pairs of wheels 22 and 24. As will be readily apparent to those persons skilled in the art, the wheels need not be utilized in pairs, but rather one or more spaced wheels can be used in place of each pair shown. As seen in FIG. 1 of the drawings, the pairs of wheels are spaced transversely of the frame 16, to be used for various different purposes.

During transport of the disc harrow 10 on a roadway or the like, the discs 12a and 14a are to be in elevated positions. At this time, the wheels 22 and 24 are in their lowermost positions.

The wheels can also be used to control the depth of cut of the discs 12a and 14a during the discing operation by being in a partially lowered position where the wheels run on the ground, preventing the full weight of the disc harrow to push the discs farther into the ground to be worked.

The disc harrow 10 also can be used without any depth control afforded by the wheels 22 and 24. In such case the wheels must be in their raised or retracted positions out of engagement with the ground.

Referring most particularly to FIG. 3 of the drawings, the support wheels 22 and 24 are provided with substantially separate operating means 26 and 28. Operating means 26 comprises a rotatable shaft 30 which is suitably and rotatably mounted in bearings secured to the frame members 16a and 16e. As shown with respect to frame member 16a, such bearing means comprises a bearing member 32 and removable bearing plate 32a thereon, as well as an L-shaped mounting bracket 34 which is secured to frame member 16a as by welding, brazing, soldering or the like and which carries the bearing member 32 through the use of mounting bolts 36. The end 30a of shaft 30 is thus firmly but rotatably secured relative to frame member 16a.

In like fashion, the opposite end 30b of shaft 30 is correspondingly rotatably secured to frame member 16e by suitable means (not shown).

An arm 38 is firmly secured to shaft 30, as shown, as by welding, brazing, soldering or the like. Such arm, as shown most clearly in FIG. 2 of the drawings, carries the one or more support wheels 22. One or more gussets 38a may be provided between the arm 38 and shaft 30 to effect the necessary strength and rigidity of the connection between shaft 30 and arm 38.

Thus, with rotation of shaft 30, the wheel or wheels 22 are caused to rotate relative to frame 16 thus changing the elevation of such wheels with respect to the disc gangs 12 and 14.

In similar fashion, there is provided for the wheel or wheels 24, a rotatable shaft 40 the opposite ends 40a and 40b of which are suitably journaled in bearing members 42 and 44 secured to the frame members 16b and 16e respectively. An arm 46 firmly secured to shaft 40 as by welding, brazing, soldering or the like, as well as by the use of gussets 46a carries the wheel or wheels 24 to be raised and lowered with respect to frame 16.

Each of the aforedescribed wheel mechanisms 26 and 28 is provided with separate and distinct hydraulic actuators, as shown at 48 and 50, respectively. Hydraulic actuator 48 comprises a cylinder 48a which houses a piston, there being a piston rod 48b connected at one end to such piston and at its other end to a clevis 52. As shown most particularly in FIG. 1 of the drawings, the cylinder 48a is pivotally connected to frame member 16d and suitable hydraulic lines 48c are used to conduct hydraulic fluid to opposite sides of the piston of actuator 48.

Clevis 52 is pivotally connected to a tab or extension 54 which, as shown most particularly in FIG. 3 of the drawings, is firmly welded to shaft 30. A pivot pin 56 affords relative pivotal movement between clevis 52 and extension 54.

In similar fashion, the hydraulic actuator 50 for wheels 24 comprises a hydraulic cylinder 50a and a piston (not shown) as well as a piston rod 50b one end of which is firmly secured to a clevis 58 as by welding, brazing, soldering or the like. Suitable hydraulic hoses or tubing 50c conduct fluid pressure to the cylinder 50b.

A tab or extension 60 firmly welded to shaft 40 is pivotally connected to clevis 58 by a pivot pin 62.

Thus, as shown most particularly in FIG. 7 of the drawings, when hydraulic pressure is applied to the actuators 48 and 50, the piston rods 48b and 50b are extended thereby causing the respective shafts 30 and 40 to rotate and to move the wheels 22 and 24 downwardly, thereby elevating or raising the disc gangs 12 and 14. Such pressure is provided from a reservoir 64 of hydraulic fluid and a suitable valve 66 is provided for directing the fluid as shown in the schematic drawing of FIG. 7.

To ensure that the wheels 22 and 24 are moved substantially simultaneously, as well as to ensure that they are ultimately positioned at substantially the same elevation regardless of weight distribution of the disc harrow, a link 70 is provided between the mechanisms 26 and 28. As shown in FIG. 4 of the drawings, such link 70 comprises a tension member 72 having a threaded end 72a and a head 72b. The threaded end 72a is adjustably secured to a retainer 74 which, as shown most clearly in FIG. 3 of the drawings, is generally cylindrical in construction and is provided with a pair of opposite end walls 74a and 74b.

Head 72b of shaft 72 is positioned within another generally cylindrical retainer 76 having opposite end walls 76a and 76b. Adjustment handles 78 are firmly secured to the retainer 76 as by welding, brazing, soldering or the like, in diametrically opposed relation for rotating retainer 76 as will hereinafter be explained.

The tension member 72 is formed with a shank 72c which is substantially square in cross section as shown most particularly in FIG. 5 of the drawings. In like fashion, the end wall 76a of retainer 76 is formed with a square through opening, as shown at 76c, for preventing rotation of tension member 72 with respect to retainer 76. It should be noted, however, that member 72 is not firmly secured to retainer 76 but rather is permitted to move rectilinearly relative thereto, the head 72b of shaft 72 thereby sliding within the retainer 76.

A compression spring 80 is positioned between the retainers 74 and 76 and around member 72 to retain the head 72b in engagement with end wall 76a of retainer 76 in normal operating position.

The link 70 is used to interconnect the operating mechanisms 26 and 28 of the wheels 22 and 24. An extension 82 is provided on shaft 30, and a threaded clevis 84 is adjustably secured to end wall 76b of retainer 76. A pin 86 affords pivotal movement between clevis 84 and extension 82 as will hereinafter appear.

Clevis 84 is provided with a threaded end portion 84a which is threadedly positioned within end wall 76b and which can be held in any adjusted position by a set screw 88 threadedly positioned in end wall 76b.

An extension 90 is provided on the end 40b of shaft 40 as by welding or the like. A clevis 92 is threadedly connected to end wall 74b of retainer 74 and is pivotally connected to extension 90 by a pivot pin 94. A lock nut 96 is used to retain the threaded end portion 92a in any appropriate position within the end wall 74b.

The link 70 effectively ties together the operating mechanisms 26 and 28 of the wheels 22 and 24 to ensure that even though each wheel or pair of wheels has its own hydraulic operating means, the wheels will be moved substantially simultaneously and held in relatively the same elevational position regardless of the weight distribution or other factors encountered by the disc harrow 10. That is, as seen in FIG. 7 of the drawings, the several hydraulic actuators 48 and 50 are connected to the same hydraulic circuit so that in the event one or the other of such operators encounters heavy resistance, that particular operator will be prevented from positioning its wheels at the desired elevation. Although the common hydraulic circuit ensures that the same pressures will be exerted on the several hydraulic actuators, any uneven force distribution on the disc harrow will cause different piston displacements in the hydraulic actuators and corresponding different elevations of the wheels 22 and 24, unless the aforedescribed link 70 is provided. With such link, any tendency of one or the other shafts 30 and 40 to fail to move, is overcome by the other shaft's tendency to move. Thus, the shafts 30 and 40 are tied together in pushing the wheels 22 and 24 downwardly.

The aforedescribed system is desirable until conditions prevail wherein it is desired to have the wheels at different elevations. One such condition occurs where the discing operation is to be performed evenly and to a fixed depth in the ground.

Normally, the open end 12b of the forward disc gang tends to dig deeper into the ground than do the other discs when the disc harrow 10 is operated with its wheels 22 and 24 out of engagement with the ground. To prevent this, and to better control the depth of cut of all of the discs, it is desirable to have the wheel or wheels 22 extend lower than the wheel or wheels 24.

To accomplish this with the abovedescribed arrangement, one or more spacers 98 as shown in FIGS. 3 and 6, are employed on the piston rod 48b of hydraulic actuator 48. Such spaces are generally cylindrical in construction and have a slot 98a wherein is positioned a spring clip 100. Such clip is held in place, as shown in FIG. 6, by suitable fastening means 102.

Each spacer 98 is urged onto the piston rod 48b against the force of spring clip 100, the latter holding the spacer in such position as shown.

As shown in FIGS. 3, 7 and 8, several such spacers may be employed, the number used determining the difference in elevation between the wheels 22 and 24. With the spacers 98 thus positioned, upon retraction of the piston rods 48b and 50b of the actuators 48 and 50, the travel of actuator 48 is limited by interference of the spacers 98 with the cylinder 48a and clevis 52. In dissimilar fashion, the travel of piston rod 50b is unimpeded, the clevis 58 being permitted to move into engagement with the cylinder 50b, as shown most particularly in FIG. 8 of the drawings.

Such difference in movement and ultimate positioning of the wheels 22 and 24 is permitted by the lost motion connection between tension member 72 and retainer 76 of link 70. That is, under such conditions, the head 72b of tension member 72 moves within retainer 76 against the force of compression spring 80 between the several retainers 74 and 76. The amount of such lost motion within the link 70 is, of course, determined by the total width or thickness of the spacers 98.

Thus, as shown in FIG. 8 of the drawings, even though the several hydraulic actuators 48 and 50 are on the same hydraulic circuit, the wheels can be positioned at different elevations as indicated by the difference in dimensions Y and Z shown in such drawing.

In the event it is desired to change the elevation of the wheels with respect to the frame when the actuators 48 and 50 are fully extended or retracted, it is a simple matter to alter the threaded engagement between clevis 84 and end wall 76b, the threaded engagement between end 72a and end wall 74a, or the threaded engagement between clevis 92 and end wall 74b. With the mechanism assembled as shown in FIG. 3, the set screw 88 can be retracted to permit the retainer 76 to be rotated by the use of handles 78. This alters the threaded engagement of retainer 76 with clevis 84 and of end portion 72a with retainer 74.

It is desirable to have the compression spring 80 strong enough to retain the head 72b of tension member 72 against the end wall 76a of retainer 76, but weak enough to permit the spacers 98 to compress such spring with the weight of the disc harrow 10.

It is thus seen that the present invention provides a disc harrow having unique support wheel control means. Although I have shown and described certain specific embodiments of my invention, I am well aware that many modifications thereof are possible. The invention is not to be restricted except insofar as is necessitated by the prior art and by the scope of the appended claims.

I claim:
1. A disc harrow comprising,
a pair of disc gangs each having a plurality of discs and fixed to a frame to be pulled over the ground to be disced,
at least two spaced support wheels for said frame,
a separate mounting mechanism for each of said wheels attached to said frame and operable to move the respective wheel toward and away from said frame,
a separate hydraulic actuator for each of said mechanisms,
and link means interconnecting said mechanisms to cause substantially simultaneous operation of said mechanisms but only in moving said wheels away from said frame.
2. A disc harrow according to claim 1,
wherein said link means includes adjustment means for varying the interconnection of said mechanisms.
3. A disc harrow comprising,
a pair of disc gangs each having a plurality of discs and fixed to a frame to be pulled over the ground to be disced,
at least two spaced support wheels for said frame,
a separate mounting mechanism for each of said wheels attached to said frame and operable to move the respective wheel toward and away from said frame,
a separate hydraulic actuator for each of said mechanisms,
and a link interconnecting said mechanisms and including lost motion means and biasing means whereby said mechanisms move substantially simultaneously but only in one direction.
4. A disc harrow according to claim 3,
wherein means is provided limiting operation of one of said mounting mechanisms and causing said lost motion means to permit one of said wheels to move independently of the other.
5. A disc harrow according to claim 4,
wherein each of said hydraulic actuators comprises a cylinder fixed relative to said frame and a piston operatively associated with said cylinder and connected to the respective mounting mechanism.
6. A disc harrow according to claim 5,
wherein said limiting means comprises a spacer operatively interposed between one of said cylinders its respective piston to limit the travel of said piston relative to its cylinder.
7. A disc harrow according to claim 6,
wherein said lost motion means comprises a pair of retainers each of which is connected to a separate one of said mechanisms and a tension member adjustably connected to one of said retainers and movable relative to the other thereof, there being travel limiting means operatively interposed between said tension member and said other retainer to permit movement of said retainers relative to each other.
8. A disc harrow according to claim 7, wherein said biasing means comprises a compression spring interposed between said retainers providing a force urging said retainers from each other.

9. A disc harrow according to claim 8, wherein said hydraulic cylinders are connected to the same hydraulic circuit for simultaneous application of hydraulic pressure to said pistons.

10. A disc harrow according to claim 9, wherein said tension member is adjustably movable relative to said one of said retainers to thereby vary the force exerted by said compression spring on said retainers and cause said mechanisms to operate substantially simultaneously.

* * * * *